(12) United States Patent
Ren et al.

(10) Patent No.: US 8,912,779 B2
(45) Date of Patent: Dec. 16, 2014

(54) SWITCHING SCHEME FOR STEP UP-STEP DOWN CONVERTERS USING FIXED FREQUENCY CURRENT-MODE CONTROL

(75) Inventors: Hong Ren, San Jose, CA (US); Daniel Long Chen, San Jose, CA (US); Christopher Thomas Falvey, Fremont, CA (US)

(73) Assignee: Linear Technology Corporation, Milpitas, CA (US)

( * ) Notice: Subject to any disclaimer, the term of this patent is extended or adjusted under 35 U.S.C. 154(b) by 242 days.

(21) Appl. No.: 13/088,867

(22) Filed: Apr. 18, 2011

(65) Prior Publication Data

US 2011/0279098 A1 Nov. 17, 2011

Related U.S. Application Data

(60) Provisional application No. 61/325,690, filed on Apr. 19, 2010.

(51) Int. Cl.
*H02M 3/158* (2006.01)

(52) U.S. Cl.
CPC .................................. *H02M 3/1582* (2013.01)
USPC ......................................... 323/283; 323/259

(58) Field of Classification Search
CPC ...................................................... H02M 3/158
USPC .................. 323/282–285, 259, 271
See application file for complete search history.

(56) References Cited

U.S. PATENT DOCUMENTS

| | | | | |
|---|---|---|---|---|
| 5,506,493 | A * | 4/1996 | Stengel | 323/223 |
| 6,166,527 | A * | 12/2000 | Dwelley et al. | 323/222 |
| 6,348,779 | B1 * | 2/2002 | Sluijs | 323/222 |
| 6,348,781 | B1 * | 2/2002 | Midya et al. | 323/224 |
| 6,724,174 | B1 * | 4/2004 | Esteves et al. | 323/224 |
| 7,466,112 | B2 * | 12/2008 | Zhou et al. | 323/259 |
| 7,768,245 | B1 * | 8/2010 | De Cremoux | 323/259 |

(Continued)

FOREIGN PATENT DOCUMENTS

| | | |
|---|---|---|
| DE | 39 14 069 A1 | 10/1990 |
| EP | 1 689 070 A2 | 8/2006 |
| EP | 2 009 776 A1 | 12/2008 |

OTHER PUBLICATIONS

Extended European Search Report, issued in European Patent Application No. 11 003 282.8, dated Nov. 21, 2011.

*Primary Examiner* — Gary L Laxton
*Assistant Examiner* — Kyle J Moody
(74) *Attorney, Agent, or Firm* — McDermott Will & Emery LLP (57) ABSTRACT

Novel circuitry and methodology for controlling a step up-step down switching regulator that produces a regulated output signal at an output node in response to an input signal at an input node, and has an inductive device, a plurality of switching circuits for providing connection of the inductive device to the input and output nodes and a ground node, and a switch control circuit for driving the switching devices so as to enable the power supply system to operate in a boost mode to increase the input signal, in a buck mode to decrease the input signal, and in a buck-boost mode when a difference between the input signal and the output signal is within a predetermined range. Buck-boost latch circuitry is provided for latching a transition between the buck mode and the buck-boost mode, or between the boost mode and the buck-boost mode based on a predetermined condition.

24 Claims, 7 Drawing Sheets

(56) References Cited

U.S. PATENT DOCUMENTS

| | | | |
|---|---|---|---|
| 7,893,665 B2* | 2/2011 | Belch | 323/222 |
| 8,179,113 B2* | 5/2012 | Singnurkar | 323/283 |
| 8,319,483 B2* | 11/2012 | Fishelov et al. | 323/271 |
| 8,749,215 B2* | 6/2014 | Hester | 323/282 |
| 8,773,092 B2* | 7/2014 | Fishelov et al. | 323/271 |
| 2008/0001587 A1* | 1/2008 | Cremoux | 323/282 |
| 2008/0116869 A1 | 5/2008 | Nishida | |
| 2009/0102440 A1* | 4/2009 | Coles | 323/271 |
| 2009/0256535 A1* | 10/2009 | Houston et al. | 323/262 |
| 2010/0026263 A1* | 2/2010 | Moussaoui et al. | 323/283 |
| 2010/0315849 A1* | 12/2010 | Ingemi et al. | 363/89 |
| 2011/0043172 A1* | 2/2011 | Dearn | 323/259 |
| 2011/0241636 A1* | 10/2011 | Wu et al. | 323/272 |
| 2012/0274295 A1* | 11/2012 | Lin et al. | 323/282 |
| 2014/0210437 A1* | 7/2014 | Chen, Wei | 323/271 |
| 2014/0217996 A1* | 8/2014 | Peker et al. | 323/271 |

* cited by examiner

SWITCHING SCHEME FOR STEP UP-STEP DOWN CONVERTERS USING FIXED FREQUENCY CURRENT-MODE CONTROL

This application claims priority of U.S. provisional application 61/325,690 filed on Apr. 19, 2010 and incorporated herewith by reference.

TECHNICAL FIELD

This disclosure relates to power supply systems, and more particularly, to controlling a step up-step down switching regulator using fixed frequency current mode control.

BACKGROUND ART

Figure 1:
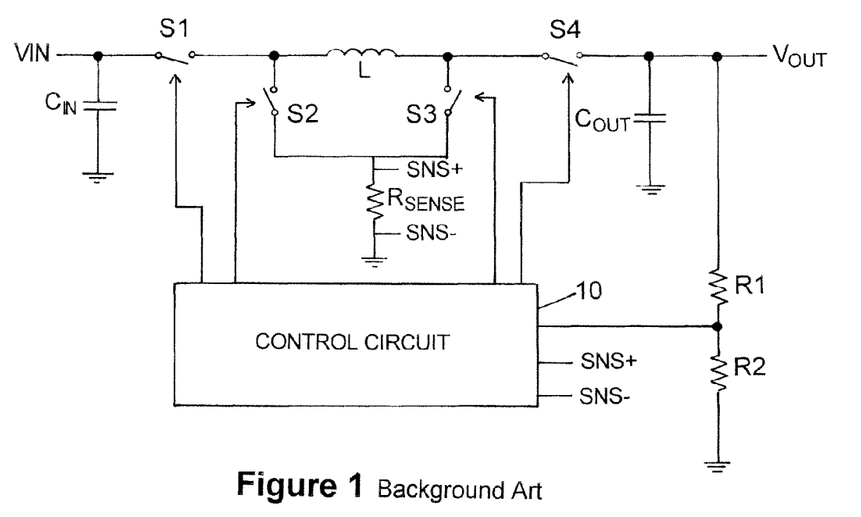
FIG. 1 illustrates an exemplary conventional switching regulator.

A step up-step down or a buck-boost switching regulator produces an output voltage VOUT that can be above, below, or at the same level as input voltage VIN. FIG. 1 shows a conventional step up-step down switching regulator including an inductor L, switches S1 and S2 coupled between the input VIN and the inductor L, and switches S3 and S4 coupled between the inductor L and the output VOUT. Input capacitor $C_{IN}$ and output capacitor $C_{OUT}$ are respectively coupled to the input VIN and output VOUT. A sense resistor $R_{SENSE}$ is provided for sensing current. Current sense inputs SNS+ and SNS− arranged at both sides of the sense resistor $R_{SENSE}$ can supply input signals to a current sense comparator for determining the inductor current $I_L$. A voltage divider composed of resistors R1 and R2 provides the output voltage VOUT to a control circuit 10 for regulation.

Figure 2:
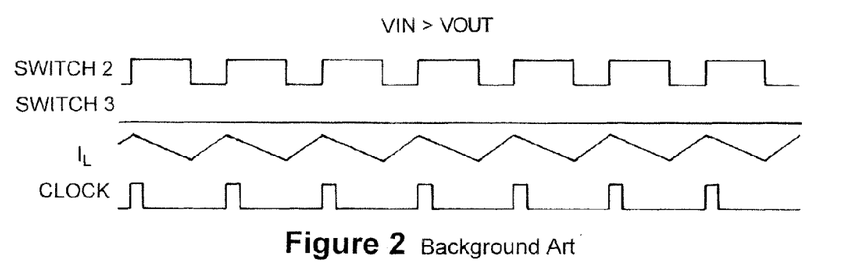
FIGS. 2-5 are timing diagrams illustrating operations of the conventional regulator.

In particular, the control circuit 10 controls switches S1 to S4 to provide peak current mode regulation in a boost mode when VIN is lower than VOUT, and to provide valley current mode regulation in a buck mode when VIN is higher than VOUT. As illustrated in FIG. 2, in a buck mode (VIN>VOUT), switch S3 (SWITCH 3) is always turned off, and switch S2 (SWITCH 2) is controlled by an error amplifier in the control circuit 10. The error amplifier provides an error signal representing a difference between the output voltage VOUT and a reference voltage VREF. Also, FIG. 2 shows a clock signal CLOCK used to control switching of the switches S1-S4, and the current $I_L$ in the inductor L. In this mode, switch S4 is always turned on, and switch S1 is controlled to provides synchronous rectification.

Figure 3:
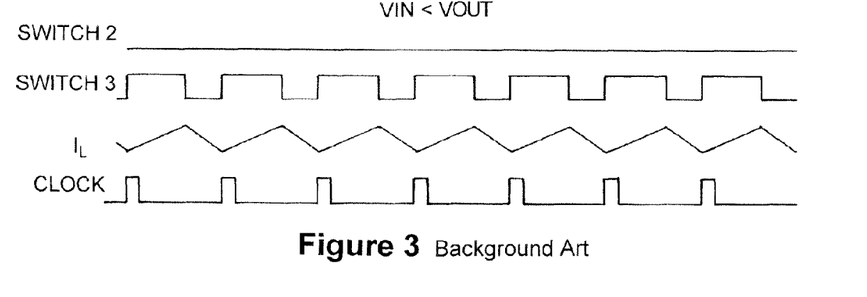

As shown in FIG. 3, in a boost mode (VIN<VOUT), switch S2 (SWITCH 2) is always turned off and switch S3 (SWITCH 3) is controlled by the error amplifier. In this mode, switch S1 is always turned on, and switch S4 is controlled to provide synchronous rectification. FIG. 3 also shows the clock signal CLOCK and the inductor current $I_L$.

When VIN is close to VOUT, the step up-step down regulator operates in a buck-boost mode, in which all switches are turned on and off each cycle. Two cases can exist in the buck-boost mode—the input voltage VIN is slightly less than the output voltage VOUT, or VIN is slightly higher than VOUT.

Figure 4:
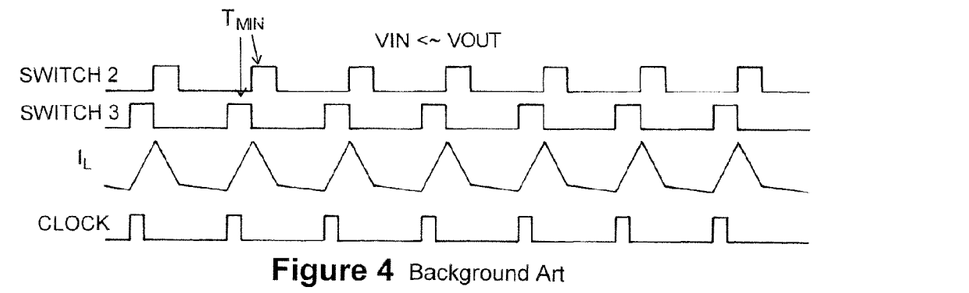

When the input voltage VIN is slightly less than the output voltage VOUT, switches S1 and S3 turn on at the start of the clock cycle CLOCK. If the error amplifier forces the switches off before some minimum on-time $T_{MIN}$, then switches S2 and S4 will turn on for a minimum on-time. After switch S2 turns off, switch S1 will turn on for the remainder of the clock cycle, and switch S4 will remain in the on-state. FIG. 4 illustrates operation of switches S2 and S3 in this mode, and shows the clock signal CLOCK and the inductor current $I_L$.

Figure 5:
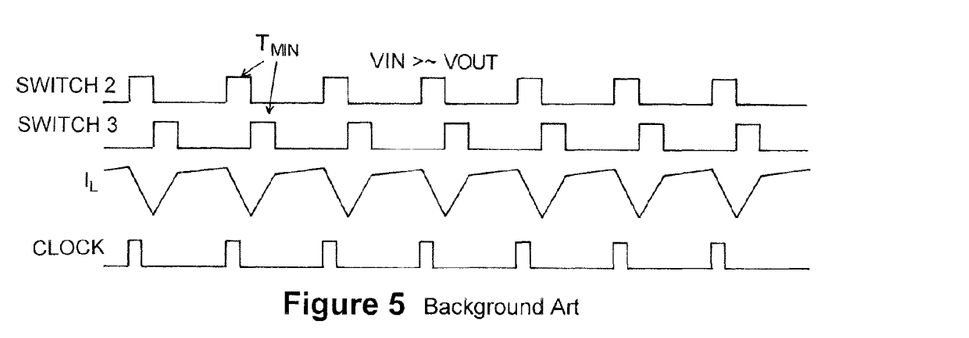

When the input voltage VIN is slightly higher than the output voltage VOUT, switches S2 and S4 turn on at the start of the clock cycle CLOCK. If the error amplifier forces the switches off before some minimum on-time $T_{MIN}$, then switches 1 and 3 will turn on for the minimum on-time $T_{MIN}$. After switch S3 turns off, switch S4 will turn on for the remainder of the clock cycle, and switch I will remain in the on-state. FIG. 5 illustrates operation of switches S2 and S3 in this mode, and shows the clock signal CLOCK and the inductor current $I_L$.

This conventional switching scheme, works well when the regulator operates purely in a buck mode, or in a boost mode, but not so well in buck-boost mode. During buck-boost mode the switches S1-S4 do not always turn on at a fixed frequency, which may result in increased electromagnetic interference (EMI).

Hence, there is a need for a control circuit that would control switches of the step up-step down regulator so as to provide switching in a buck-boost mode at a fixed frequency.

SUMMARY OF THE DISCLOSURE

The present disclosure offers novel circuitry and methodology for controlling a step up-step down switching regulator. In accordance with one aspect of the disclosure, a power supply system for producing a regulated output signal at an output node in response to an input signal at an input node, comprises an inductive device, a plurality of switching circuits for providing connection of the inductive device to the input and output nodes and a ground node, and a switch control circuit for driving the switching devices so as to enable the power supply system to operate in a boost mode to increase the input signal, in a buck mode to decrease the input signal, and in a buck-boost mode when a difference between the input signal and the output signal is within a predetermined range. The switch control circuit including buck-boost latch circuitry for latching a transition between the buck mode and the buck-boost mode, or between the boost mode and the buck-boost mode based on a predetermined condition.

The switching circuits may include:

a first switching circuit provided for coupling the input node to a first node of the inductive device, a second switching circuit provided for coupling the first node of the inductive device to the ground node, a third switching circuit provided for coupling a second node of the inductive device to the ground node, and a fourth switching circuit provided for coupling the second node of the inductive device to the output node.

The switch control circuit may operate in a valley current control mode to control the switching circuits based on a sensed valley of the inductor current when the power supply system operates in the buck mode, and to operate in a peak current control mode to control the switching circuits based on a sensed peak of the inductor current when the power supply system operates in the boost mode.

The buck-boost latch circuitry may prevent a transition from the buck or boost mode to the buck-boost mode until on-time of at least one of the switching circuits reaches a preset minimum value.

In particular, the buck-boost latch circuitry may prevent a transition from the buck mode to the buck-boost mode until on-time of the second switching circuit reaches the preset minimum value, and may prevent a transition from the boost mode to the buck-boost mode until on-time of the third switching circuit reaches the preset minimum value.

Further, the buck-boost latch circuitry may prevent a transition from the buck-boost mode to the buck or boost mode until on-time of at least one of the switching circuits exceeds a preset maximum value.

In particular, the buck-boost latch circuitry may prevent a transition from the buck-boost mode to the buck mode until the on-time of the second switching circuit exceeds the preset maximum value, and may prevent a transition from the buck-boost mode to the boost mode until the on-time of the third switching circuit exceeds the preset maximum value.

In an exemplary embodiment, the switch control circuit may include a clock circuit for supplying a first clock signal and a second clock signal provided out of phase with respect to the first clock signal. For example, the second clock signal may be provided about 180 degrees out of phase with respect to the first clock signal.

The first clock signal may be provided to turn on the second switching circuit and the second clock signal may be provided to turn on the third switching circuit.

The switch control circuit may further include first and second comparators responsive to a sensed inductor current and an error signal representing the output signal to produce signals representing inductor peak current and inductor valley current.

An exemplary buck-boost latch circuitry may include first and second latching circuits having first inputs respectively responsive to outputs of the first and second comparators, and second inputs respectively supplied with the first and second clock signals produced out of phase with respect to each other.

First and second duration comparing circuits may be respectively coupled to outputs of the first and second latching circuits for comparing duration values produced at the outputs of the first and second latching circuits with the preset minimum and maximum values, to produce a first control signal at an output of the first duration comparing circuit and to produce a second control signal at an output of the second duration comparing circuit.

The first control signal may go from a first logic level to a second logic level when the on-time of the second switching circuit becomes less than the preset minimum value to enable a transition from the buck mode to the buck-boost mode.

The second control signal may go from a first logic level to a second logic level when the on-time of the third switching circuit becomes less than the preset minimum value to enable a transition from the boost mode to the buck-boost mode.

Further, the first control signal may go from the second logic level to the first logic level when the on-time of the second switching circuit exceeds the preset maximum value to enable a transition from the buck-boost mode to the buck mode.

The second control signal may go from the second logic level to the first logic level when the on-time of the third switching circuit exceeds the preset maximum value to enable a transition from the buck-boost mode to the boost mode.

In accordance with the present disclosure, the following steps may be carried out to control a switching regulator having a plurality of switching circuits:

driving the switching circuits so as to enable the regulator to operate in a boost mode to increase the input signal, in a buck mode to decrease the input signal, and in a buck-boost mode when a difference between the input signal and the output signal is within a predetermined range, and preventing a transition between the buck mode and the buck-boost mode, or between the boost mode and the buck-boost mode until a predetermined condition is met.

In particular, the transition from the buck mode or the boost mode to the buck-boost mode may be prevented until the on-time of at least one of the switching devices reaches a preset minimum value, and the transition from the buck-boost mode to the buck mode or the boost mode may be prevented until the on-time of at least one of the switching devices exceeds a preset maximum value.

The switching devices may be controlled by a pair of clock signals produced out of phase with respect to each other.

The step of preventing a transition may include producing a first control signal that goes from a first logic level to a second logic level when on-time of at least one of the switching devices becomes less than a preset minimum value so as to prevent transition from the buck mode to the buck-boost mode until the on-time reaches the preset minimum value. The first control signal may go from the second logic level to the first logic level when the on-time exceeds a preset maximum value so as to prevent transition from the buck-boost mode to the buck mode until the on-time exceeds the preset maximum value.

The step of preventing a transition may also include producing a second control signal that goes from a first logic level to a second logic level when on-time of at least one of the switching devices becomes less than a preset minimum value so as to prevent transition from the boost mode to the buck-boost mode until the on-time reaches the preset minimum value. The second control signal goes from the second logic level to the first logic level when the on-time exceeds a preset maximum value so as to prevent transition from the buck-boost mode to the boost mode until the on-time exceeds the preset maximum value.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The drawing figures depict concepts by way of example, not by way of limitations. In the figures, like reference numerals refer to the same or similar elements.

DETAILED DISCLOSURE OF THE EMBODIMENTS

The present disclosure will be made with an examples of a switching regulator control arrangement shown in FIG. 6. It will become apparent, however, that the concepts described herein are applicable to any control scheme for controlling any power supply circuit for providing an output voltage or current above, below or equal to the input voltage or current.

Figure 6:
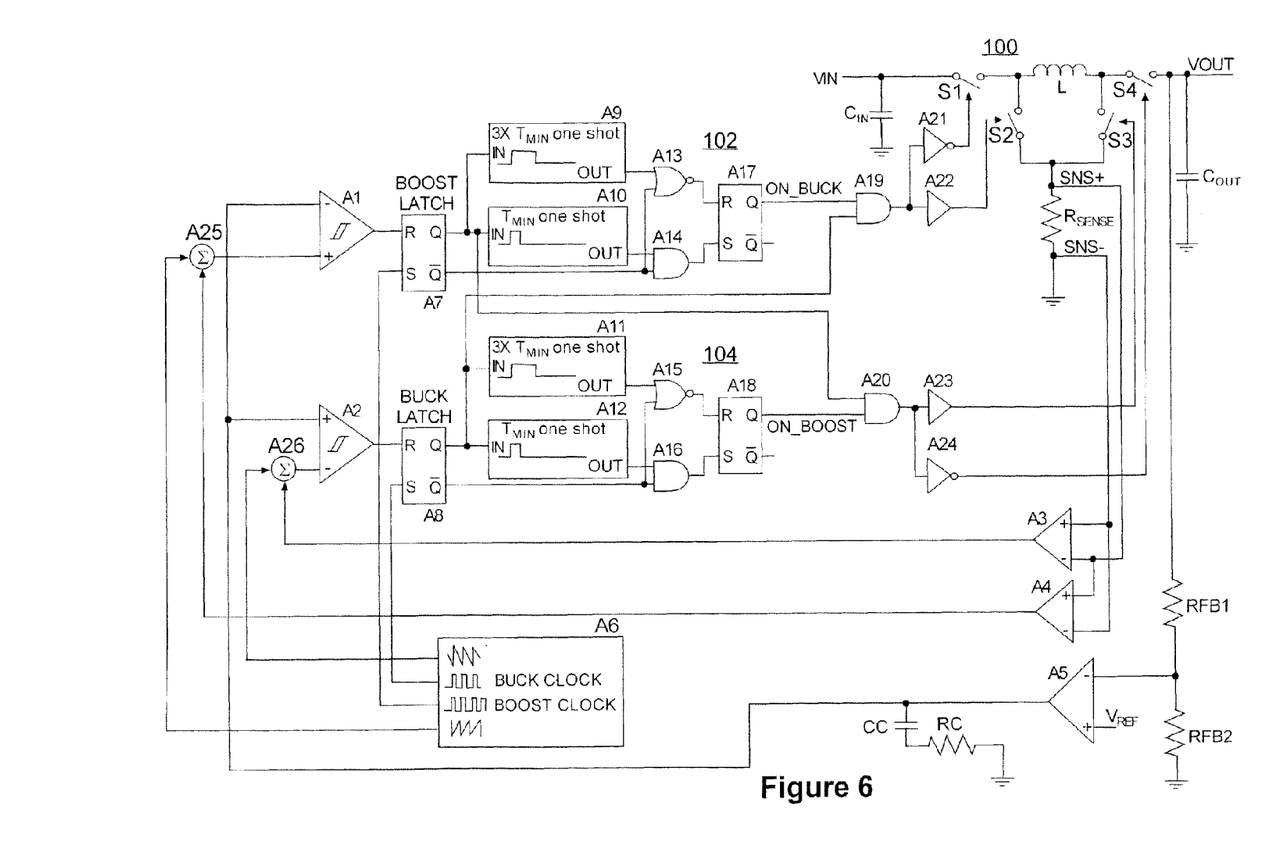
FIG. 6 schematically shows a control scheme for controlling step up-step down switching regulator in accordance with the present disclosure.

As shown in FIG. 6, an exemplary step up-step down switching regulator 100 of the present disclosure includes inductor L and switches S1-S4 arranged to provide connection of the inductor L to input node VIN, output node VOUT and a ground node in boost, buck and buck-boost modes. When the input voltage VIN is well above the output voltage VOUT, the switches S1-S4 are controlled so as to set the regulator into a buck mode of operation. When the VIN is well below the VOUT, the switches S1-S4 are controlled so as to set the regulator into a boost mode of operation. When a difference between the VIN and the VOUT is within a predetermined range, the switches S1-S4 are controlled so as to set the regulator into a buck-boost mode of operation.

Switch control circuitry for controlling the switches S1-S4 includes comparators A1 and A2, current sense amplifiers A3 and A4, an error amplifier A5, a clock and ramp generator A6, and boost and buck latch circuits A7 and A8. The switch control circuitry also includes a first digital comparator 102 composed of one-shot circuits A9, A10, NOR gate circuit A13, AND gate circuit A14 and RS flip flop A17, and a second digital comparator 104 composed of one-shot circuits A11, A12, NOR gate circuit A15, AND gate circuit A16 and RS flip flop A18. Further, the switch control circuitry includes AND gates A19 and A20, and switch drivers A21, A22, A23 and A24.

As disclosed in more detail below, the boost and buck latch circuits A7 and A8, together with the digital comparators 102 and 104, and the AND gates A19 and A20, constitute an exemplary buck-boost latch circuitry controlled by a pair of clock signals for latching a transition between the buck mode and the buck-boost mode, or between the boost mode and the buck-boost mode.

Input capacitor $C_{IN}$ and output capacitor $C_{OUT}$ are respectively coupled to the input VIN and output VOUT. A sense resistor $R_{SENSE}$ is provided for sensing current. Current sense inputs SNS+ and SNS− arranged at both sides of the sense resistor $R_{SENSE}$ can supply input signals to the current sense comparators A3 and A4 for determining the inductor current $I_L$. A voltage divider composed of resistors RFB1 and RFB2 provides the error amplifier with a signal representing the output voltage VOUT. A compensation circuit composed of resistor RC and capacitor CC is connected to the output of the error amplifier A5. Adders A25 and A26 are provided at the inputs of the comparators A1 and A2, respectively.

When the switching regulator 100 operates in the buck mode, the switch control circuitry operates in a valley current control mode, in which the switch control circuit controls the switches S1-S4 based on the sensed valley of the inductor current $I_L$. The inverting input of the current sense amplifier A3 is connected to the SNS+ input and the non-inverting input of the amplifier A3 is connected to the SNS− inputs so as to sense the valley of the inductor current $I_L$ in the valley current control mode.

When the switching regulator 100 operates in the boost mode, the switch control circuitry operates in a peak current control mode, in which the switch control circuitry controls the switches S1-S4 based on the sensed peak of the inductor current $I_L$. The inverting input of the current sense amplifier A4 is connected to the SNS− input and the non-inverting input of the amplifier A4 is connected to the SNS+ inputs, so as to sense the peak of the inductor current $I_L$ in the peak current control mode.

The error amplifier A5 compares a value representing the output voltage VOUT with a reference voltage Vref that may be provided by a reference voltage source, to produce an error signal representing a difference between the output voltage VOUT and the reference voltage Vref. The error signal is supplied to the inverting input of the comparator A1 and the non-inverting input of the comparator A2.

The non-inverting input of the comparator A1 is fed with an output signal of the adder A25 that adds values of the peak inductor current from the current sense amplifier A4 and a ramp signal from the generator A6. The inverting input of the comparator A2 is fed with an output signal of the adder A26 that adds values of the valley inductor current from the current sense amplifier A3 and a ramp signal from the generator A6.

The comparators A1 and A2 compare their respective inputs to produce signals at their outputs. The comparators A1 and A2 may be configured to produce pulse width modulation (PWM) signals at their outputs. Also, the comparators A1 and A2 may be configured to have internal hysteresis. Alternatively, an external hysteresis network may be arranged at each of the comparators A1 and A2.

The output of the comparator A1 is supplied to the reset (R) input of the boost latch circuit A7, and the output of the comparator A2 is provided to the R input of the buck latch circuit A8. The boost latch circuit A7 is set with a boost clock signal produced by the generator A6, and buck latch circuit A8 is set with a buck clock signal produced by the generator A6 out of phase with respect to the boost clock signal. For example, the buck clock signal and boost clock signal may be 180 degrees out of phase. As discussed in more detail later, in an exemplary implementation of the present invention, the buck clock signal is used by the switch control circuitry to turn on the switch S2, and the boost clock signal is used by the switch control circuitry to turn on the switch S3.

The outputs of the latch circuits A7 and A8 produce duration values respectively representing the peak and the valley of the inductor current $I_L$. The digital comparators 102 and 104 compare these duration values with a predetermined minimum on-time value $T_{MIN}$ and a predetermined maximum on-time value $T_{MAX}$. The minimum on-time value $T_{MIN}$ may correspond to the minimum time interval during which a controlled switch is allowed to be in an on-state.

In particular, the digital comparator 102 includes the one-shot circuit A10 that produces a pulse defining the predetermined $T_{MIN}$ value, and the one-shot circuit A9 that produces a pulse defining the predetermined $T_{MAX}$ value. For example, the $T_{MAX}$ value may be selected to be equal to $3T_{MIN}$. The inputs of the one-shot circuits A9 and A10 are supplied with the signal produced at the output Q of the boost latch circuit A7. The output of the one-shot circuit A9 is connected to one input of the NOR gate A13, the other input of which is connected to the inverted output Q/ of the boost latch circuit A7. The output of the one-shot circuit A10 is connected to one input of the AND gate A14, the other input of which is connected to the inverted output Q/ of the circuit A7. The output signal of the AND gate A14 is used to set the RS flip flop circuit A17, the output signal of the NOR gate A13 provides reset of the RS flip flop circuit A17. As a result, the RS flip flop circuit A17 produces a control signal ON_BUCK.

The digital comparator 104 includes the one-shot circuit A12 that produces a pulse defining the predetermined $T_{MIN}$ value, and the one-shot circuit A11 that produces a pulse defining the predetermined $T_{MAX}$ value. For example, the $T_{MAX}$ value may be selected to be equal to $3T_{MIN}$. The inputs of the one-shot circuits A11 and A12 are supplied with the signal produced at the output Q of the buck latch circuit A8. The output of the one-shot circuit A11 is connected to one input of the NOR gate A15, the other input of which is connected to the inverted output Q/ of the buck latch circuit A8. The output of the one-shot circuit A12 is connected to one input of the AND gate A16, the other input of which is connected to the inverted output Q/ of the circuit A8. The output signal of the AND gate A16 is used to set the RS flip flop circuit A18, the output signal of the NOR gate A15 provides reset of the RS flip flop circuit A18. As a result, the RS flip flop circuit A17 produces a control signal ON_BOOST.

The AND gate A19 is supplied with the Q output of the buck latch circuit A8 and the ON_BUCK control signal to produce an output signal that controls switches S1 and S2 via drivers A21 and A22, respectively. The AND gate A20 is supplied with the Q output of the boost latch circuit A7 and the ON_BOOST control signal to produce an output signal that controls switches S3 and S4 via drivers A23 and A24, respectively.

In the buck mode, the switches S1-S4 are controlled in the manner similar to operations of a regular switching regulator illustrated in FIG. 2, i.e. switch S3 is always turned off, switch S4 is always turned on, switch S2 is controlled based on a error signal from the error amplifier A5, and switch S1 is used for providing synchronous rectification. However, instead of clock signal CLOCK, the buck clock signal is applied to turn on switch S2. In the buck mode, the ON_BUCK control signal is at a high level, and the ON_BOOST control signal is at a low level.

In the boost mode, the switches S1-S4 are controlled in the manner similar to operations of a regular switching regulator illustrated in FIG. 3, i.e. switch S2 is always turned off, switch S1 is always turned on, switch S3 is controlled based on an error signal from the error amplifier A5, and switch S4 is used for providing synchronous rectification. However, instead of clock signal CLOCK, the boost clock signal is applied to turn on switch S3. In the boost mode, the ON_BOOST control signal is at a high level, and the ON_BUCK control signal is at a low level.

When VIN is close to VOUT, the step up-step down regulator 100 operates in a buck-boost mode, in which all switches are turned on and off each cycle. The regulator 100 may be switched into the buck-boost mode, when a difference between VIN and VOUT is less than a value that may be pre-set, for example, in the range from 500 mV to 1.5 V depending on the clock frequency. Two cases can exist in the buck-boost mode—the input voltage VIN is slightly less than the output voltage VOUT, or VIN is slightly higher than VOUT.

Transitions to and from the buck-boost mode are discussed below with references to timing diagrams in FIGS. 7-12, in which the buck clock signal produced by the generator A6 is represented by signal CLOCK1, and the boost clock signal produced by the generator A6 is represented by signal CLOCK2. The diagrams SWITCH 2 and SWITCH 3 in FIGS. 7-12 show exemplary operations of switches S2 and S3, respectively. It is noted that switch S1 is controlled together with switch S2, and switch S4 is controlled together with switch S3. When switch S2 or S3 is turned on, the respective switch S1 or S4 is turned off, and when the switch S2 or S3 is turned off, the respective switch S1 or S4 is turned on. Also, FIGS. 7-12 illustrate variations of the inductor current $I_L$.

Figure 7:
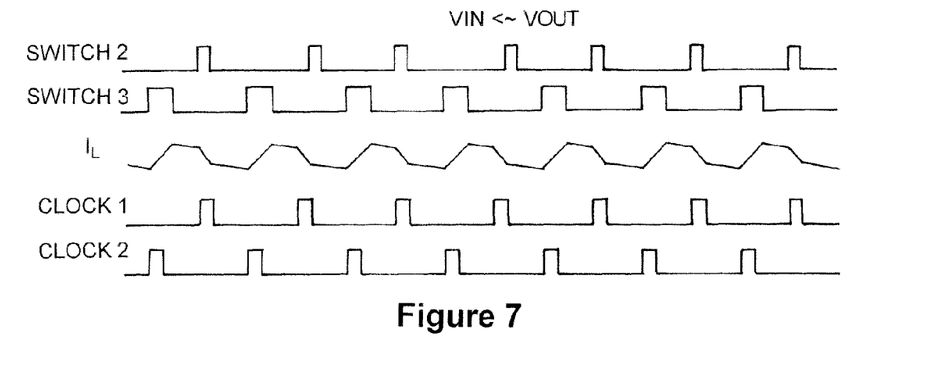
FIGS. 7 and 8 are timing diagrams that illustrate operations in a buck-boost mode in accordance with the present disclosure.

As illustrated in FIG. 7, in the buck-boost mode, when the input voltage VIN is slightly less than the output voltage VOUT, the buck clock signal CLOCK1 supplied via the buck latch circuit A8 turns on switch S2, and the boost clock signal CLOCK2 supplied via the boost latch circuit A7 turns on switch S3. In this mode, both the ON_BOOST and ON_BUCK control signals are at a high level.

Figure 8:
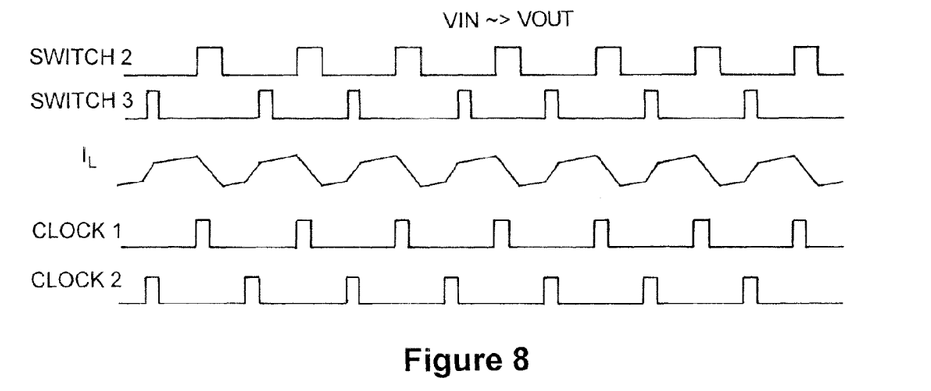

As illustrated in FIG. 8, in the buck-boost mode, when the input voltage VIN is slightly higher than the output voltage VOUT, the buck clock signal CLOCK1 also turns on switch S2, and the boost clock signal CLOCK2 also turns on switch S3. In this mode, both the ON_BOOST and ON_BUCK control signals are at a high level.

Figure 9:
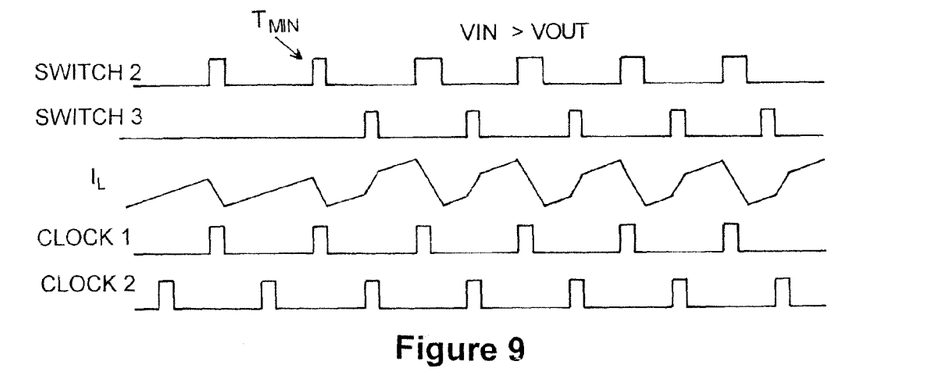
FIG. 9 is a timing diagram that illustrates a transition from a buck mode to a buck-boost mode in accordance with the present disclosure.

FIG. 9 illustrates a transition from the buck mode to the buck-boost mode. In the buck mode, switch S2 is turned on by the buck clock signal CLOCK1 applied via the buck latch circuit A8. At the same time, switch S1 is turned off. The duration at the Q output of the buck latch circuit A8 corresponds to the on-time value of the switch S2 When the duration value at the Q output of the buck latch circuit A8 becomes less than the Tmin value defined by the one-shot circuit A12, the ON_BOOST signal goes high to enable the boost clock signal CLOCK2 to turn on switch S3 and turn off switch S4, i.e. to allow transition in the buck-boost mode. Hence, the switch control circuitry prevents a transition from the buck mode to the buck-boost mode until the on-time of the switch S2 reaches a preset minimum value $T_{MIN}$.

Figure 10:
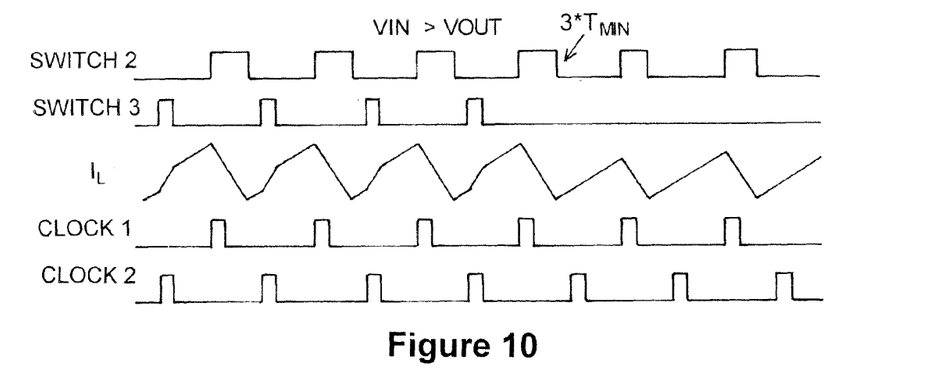
FIG. 10 is a timing diagram that illustrates a transition from a buck-boost mode to a buck mode in accordance with the present disclosure.

FIG. 10 illustrates a transition from the buck-boost mode to the buck mode. In the buck-boost mode, the switch S2 is turned on by the buck clock signal CLOCK1 applied via the buck latch circuit A8, and the switch S3 is turned on by the boost clock signal CLOCK2 applied via the boost latch circuit A7. When the duration value at the Q output of the buck latch circuit A8 (corresponding to the on-time value of switch S2) exceeds the $3T_{MIN}$ value (i.e. the $T_{MAX}$ value) defined by the one-shot circuit A11, the ON_BOOST signal goes low preventing the switch S3 from being turned on by the boost clock signal CLOCK2. As a result, the regulator 100 switches to the buck mode. Hence, the switch control circuitry prevents a transition from the buck-boost mode to the buck mode until the on-time of the switch S2 exceeds a preset maximum value $T_{MAX}$.

Figure 11:
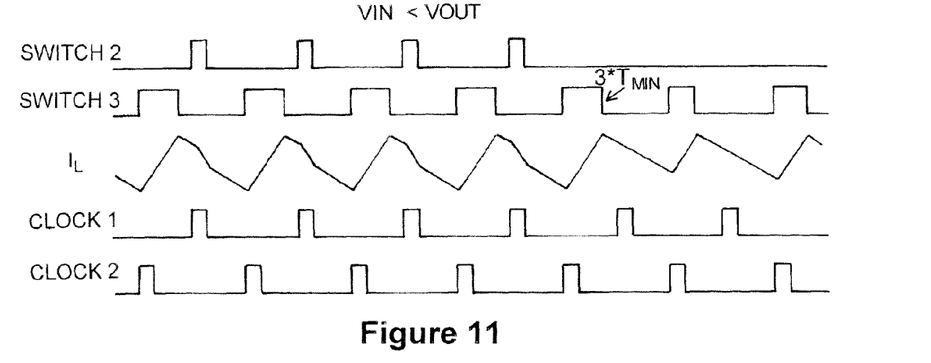
FIG. 11 is a timing diagrams that illustrates a transition from a buck-boost mode to a boost mode in accordance with the present disclosure.

FIG. 11 illustrates a transition from the buck-boost mode to the boost mode. When the duration value at the Q output of the boost latch circuit A7 (corresponding to the on-time value of switch S3) exceeds the $3T_{MIN}$ value (i.e. the $T_{MAX}$ value) defined by the one-shot circuit A9, the ON_BUCK signal goes low preventing the switch S2 from being turned on by the buck clock signal CLOCK1. As a result, the regulator 100 switches to the boost mode. Hence, the switch control circuitry prevents a transition from the buck-boost mode to the boost mode until the on-time of the switch S3 exceeds a preset maximum value $T_{MAX}$.

Figure 12:
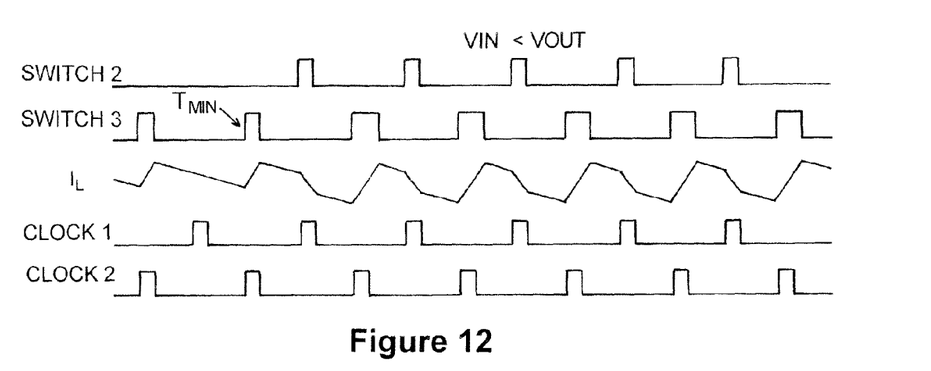
FIG. 12 is a timing diagram that illustrates a transition from a boost mode to a buck-boost mode in accordance with the present disclosure.

FIG. 12 illustrates a transition from the boost mode to the buck-boost mode. In the boost mode, switch S3 is turned on by the boost clock signal CLOCK2 applied via the boost latch circuit A7. At the same time, switch S4 is turned off. The duration at the Q output of the boost latch circuit A7 corresponds to the on-time value of the switch S3. When the duration value at the Q output of the boost latch circuit A7 becomes less than the Tmin value defined by the one-shot circuit A10, the ON_BUCK signal goes high to enable the buck clock signal CLOCK to turn on switch S2 and turn off switch S1, i.e. to allow transition in the buck-boost mode. Hence, the switch control circuitry prevents a transition from the boost mode to the buck-boost mode until the on-time value of the switch S3 reaches a preset minimum value $T_{MIN}$.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A power supply system for producing a regulated output signal at an output node in response to an input signal at an input node, comprises:
   an inductive device,
   a plurality of switching circuits for providing connection of the inductive device to the input and output nodes and a ground node, the switching circuits including a first switching circuit provided for coupling the input node to a first node of the inductive device, a second switching circuit provided for coupling the first node of the inductive device to the ground node, a third switching circuit provided for coupling a second node of the inductive device to the ground node, and a fourth switching circuit provided for coupling the second node of the inductive device to the output node, and
   a switch control circuit for driving the switching circuits so as to enable the power supply system to operate in a boost mode to increase the input signal, in a buck mode to decrease the input signal, and in a buck-boost mode when a difference between the input signal and the output signal is within a predetermined range, the switch control circuit including buck-boost latch circuitry for latching a transition between the buck mode and the buck-boost mode, or between the boost mode and the buck-boost mode based on a predetermined condition, wherein
   the buck-boost latch circuitry is configured to prevent a transition from the buck or boost mode to the buck-boost mode until an on-time of at least one of the switching circuits reaches a preset minimum value, and to prevent a transition from the buck-boost mode to the buck mode until an on-time of the second switching circuit exceeds the preset maximum value.

2. The system of claim 1, wherein the switch control circuit is configured to operate in a valley current control mode to control the switching circuits based on a sensed valley of an inductor current when the power supply system operates in the buck mode, and to operate in a peak current control mode to control the switching circuits based on a sensed peak of the inductor current when the power supply system operates in the boost mode.

3. The system of claim 1, wherein the buck-boost latch circuitry is configured to prevent a transition from the buck mode to the buck-boost mode until an on-time of the second switching circuit reaches the preset minimum value.

4. The system of claim 1, wherein the buck-boost latch circuitry is configured to prevent a transition from the boost mode to the buck-boost mode may until an on-time of the third switching circuit reaches the preset minimum value.

5. The system of claim 1, wherein the buck-boost latch circuitry is configured to prevent a transition from the buck-boost mode to the boost mode until an on-time of the third switching circuit exceeds the preset maximum value.

6. The system of claim 1, wherein the switch control circuit includes a clock circuit for supplying a first clock signal, and a second clock signal provided out of phase with respect to the first clock signal.

7. The system of claim 6, wherein the second clock signal is provided 180 degrees out of phase with respect to the first clock signal.

8. The system of claim 6, wherein the first clock signal is provided to turn on the second switching circuit and the second clock signal is provided to turn on the third switching circuit.

9. The system of claim 6, wherein the switch control circuit further includes first and second comparators responsive to a sensed inductor current and an error signal representing the output signal to produce signals representing inductor peak current and inductor valley current.

10. The system of claim 9, wherein the buck-boost latch circuitry includes first and second latching circuits having first inputs respectively responsive to outputs of the first and second comparators, and second inputs respectively supplied with the first and second clock signals produced out of phase with respect to each other.

11. The system of claim 10, wherein the buck-boost latch circuitry further includes first and second duration comparing circuits respectively coupled to outputs of the first and second latching circuits for comparing duration values produced at the outputs of the first and second latching circuits with the preset minimum and maximum values, to produce a first control signal at an output of the first duration comparing circuit and to produce a second control signal at an output of the second duration comparing circuit.

12. The system of claim 11, wherein the first control signal goes from a first logic level to a second logic level when the on-time of the second switching circuit becomes less than the preset minimum value to enable a transition from the buck mode to the buck-boost mode.

13. The system of claim 12, wherein the first control signal goes from the second logic level to the first logic level when the on-time of the second switching circuit exceeds the preset maximum value to enable a transition from the buck-boost mode to the buck mode.

14. The system of claim 11, wherein the second control signal goes from a first logic level to a second logic level when the on-time of the third switching circuit becomes less than the preset minimum value to enable a transition from the boost mode to the buck-boost mode.

15. The system of claim 14, wherein the second control signal goes from the second logic level to the first logic level when the on-time of the third switching circuit exceeds the preset maximum value to enable a transition from the buck-boost mode to the boost mode.

16. A method of controlling a switching regulator that produces a regulated output signal at an output node in response to an input signal at an input node, the regulator having an inductive device, and a plurality of switching devices for providing connection of the inductive device to the input and output nodes and a ground node, the switching circuits including a first switching circuit provided for coupling the input node to a first node of the inductive device, a second switching circuit provided for coupling the first node of the inductive device to the ground node, a third switching circuit provided for coupling a second node of the inductive device to the ground node, and a fourth switching circuit provided for coupling the second node of the inductive device to the output node, the method comprising:

driving the switching devices so as to enable the regulator to operate in a boost mode to increase the input signal, in a buck mode to decrease the input signal, and in a buck-boost mode when a difference between the input signal and the output signal is within a predetermined range, and     preventing a transition between the buck mode and the buck-boost mode, or between the boost mode and the buck-boost mode until a predetermined condition is met,     wherein a transition from the buck-boost mode to the buck mode is prevented until an on-time of the second switching circuit exceeds a preset maximum value.

17. The method of claim 16, wherein the transition from the buck mode or the boost mode to the buck-boost mode is prevented until an on-time of at least one of the switching devices reaches a preset minimum value.

18. The method of claim 16, wherein the switching devices are controlled by a pair of clock signals produced out of phase with respect to each other.

19. The method of claim 18, wherein the step of preventing a transition includes producing a first control signal that goes from a first logic level to a second logic level when on-time of at least one of the switching devices becomes less than a preset minimum value so as to prevent transition from the buck mode to the buck-boost mode until the on-time reaches the preset minimum value.

20. The method of claim 19, wherein the first control signal goes from the second logic level to the first logic level when the on-time exceeds a preset maximum value so as to prevent transition from the buck-boost mode to the buck mode until the on-time exceeds the preset maximum value.

21. The method of claim 20, wherein the step of preventing a transition includes producing a second control signal that goes from a first logic level to a second logic level when on-time of at least one of the switching devices becomes less than a preset minimum value so as to prevent transition from the boost mode to the buck-boost mode until the on-time reaches the preset minimum value.

22. The method of claim 21, wherein the second control signal goes from the second logic level to the first logic level when the on-time exceeds a preset maximum value so as to prevent transition from the buck-boost mode to the boost mode until the on-time exceeds the preset maximum value.

23. A method of controlling a switching regulator that produces a regulated output signal at an output node in response to an input signal at an input node, the regulator having an inductive device, and a plurality of switching devices for providing connection of the inductive device to the input and output nodes and a ground node, the switching circuits including a first switching circuit provided for coupling the input node to a first node of the inductive device, a second switching circuit provided for coupling the first node of the inductive device to the ground node, a third switching circuit provided for coupling a second node of the inductive device to the ground node, and a fourth switching circuit provided for coupling the second node of the inductive device to the output node, the method comprising:

driving the switching devices so as to enable the regulator to operate in a boost mode to increase the input signal, in a buck mode to decrease the input signal, and in a buck-boost mode when a difference between the input signal and the output signal is within a predetermined range, and     preventing a transition between the buck mode and the buck-boost mode, or between the boost mode and the buck-boost mode until a predetermined condition is met,     wherein a transition from the buck-boost mode to the boost mode is prevented until an on-time of the third switching circuit exceeds a preset maximum value.

24. A power supply system for producing a regulated output signal at an output node in response to an input signal at an input node, comprises:

an inductive device, a plurality of switching circuits for providing connection of the inductive device to the input and output nodes and a ground node, the switching circuits including a first switching circuit provided for coupling the input node to a first node of the inductive device, a second switching circuit provided for coupling the first node of the inductive device to the ground node, a third switching circuit provided for coupling a second node of the inductive device to the ground node, and a fourth switching circuit provided for coupling the second node of the inductive device to the output node, and     a switch control circuit for driving the switching circuits so as to enable the power supply system to operate in a boost mode to increase the input signal, in a buck mode to decrease the input signal, and in a buck-boost mode when a difference between the input signal and the output signal is within a predetermined range, the switch control circuit including buck-boost latch circuitry for latching a transition between the buck mode and the buck-boost mode, or between the boost mode and the buck-boost mode based on a predetermined condition, wherein     the buck-boost latch circuitry is configured to prevent a transition from the buck or boost mode to the buck-boost mode until an on-time of at least one of the switching circuits reaches a preset minimum value, and to prevent a transition from the buck-boost mode to the boost mode until an on-time of the third switching circuit exceeds the preset maximum value.

\* \* \* \* \*